(12) United States Patent
Yamauchi et al.

(10) Patent No.: US 8,220,010 B2
(45) Date of Patent: Jul. 10, 2012

(54) DISC DRIVE WITH CLEARANCE ADJUSTMENT MEMBER

(75) Inventors: Yoshiaki Yamauchi, Omitama (JP); Mitsutaka Shizuya, Ryugasaki (JP); Tatsumi Uchigiri, Yokohama (JP); Hisahiro Miki, Chigasaki (JP); Ikuo Nishida, Ebina (JP); Shinya Tsubota, Mito (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1089 days.

(21) Appl. No.: 12/108,572

(22) Filed: Apr. 24, 2008

(65) Prior Publication Data

US 2008/0301720 A1    Dec. 4, 2008

(30) Foreign Application Priority Data

Apr. 27, 2007   (JP) ................. 2007-118070

(51) Int. Cl.
*G11B 33/14* (2006.01)
*G11B 17/03* (2006.01)

(52) U.S. Cl. ........................ 720/651; 720/655

(58) Field of Classification Search ............ 720/645, 720/648, 649, 651, 652, 654, 655, 732–734, 720/737; 360/97.02–97.04
See application file for complete search history.

(56) References Cited

U.S. PATENT DOCUMENTS

| | | | |
|---|---|---|---|
| 2004/0216153 A1* | 10/2004 | Ota ............................ | 720/703 |
| 2006/0005214 A1* | 1/2006 | Kim et al. ................... | 720/648 |
| 2006/0051076 A1* | 3/2006 | Aman et al. ................. | 386/126 |
| 2006/0080688 A1* | 4/2006 | Soeda et al. ................ | 720/648 |
| 2008/0117726 A1* | 5/2008 | Yoshida et al. ............. | 369/30.28 |

FOREIGN PATENT DOCUMENTS

| | | |
|---|---|---|
| JP | 2003-228971 | 8/2003 |
| JP | 2007287243 A * | 11/2007 |

OTHER PUBLICATIONS

Machine-Assisted Translation of JP 2007287243 A.*

* cited by examiner

*Primary Examiner* — Nathan Danielsen
(74) *Attorney, Agent, or Firm* — Antonelli, Terry, Stout & Kraus, LLP.

(57) ABSTRACT

There is provided a disc drive by which the fluid loss of a disc is reduced and the electric power consumption of a spindle motor can be decreased. In the disc drive according to the present invention, a rotation load reducing member is provided between a top cover and the disc. The rotation load reducing member is movably supported by a clearance adjustment member. While the disc is rotating, the rotation load reducing member is moved in the direction approaching the disc. Thereby, the thickness of an air layer on the upper surface of the disc is decreased.

6 Claims, 7 Drawing Sheets

DISC DRIVE WITH CLEARANCE ADJUSTMENT MEMBER

BACKGROUND OF THE INVENTION

1. Field of the Invention

The present invention relates to a disc drive, and, especially, to a disc drive of a tray loading type.

2. Description of the Related Art

Recently, there has been a trend for electric power consumption of a disc drive such as a CD and a DVD to increase along with increasing speed of recording and reproduction. Along with it, it has become a problem that heat and noise in a disc drive are increasing. The electric power consumption of a spindle motor can be divided into two categories of a mechanical loss and a fluid loss. The fluid loss is caused by viscous resistance of air, which acts on a disc, and is called a windage loss. Generally, electric power consumption of a spindle motor is increased in proportion to the square of the rotational speed of a disc. However, the fluid loss is increased when the rotational speed of a disc is increased, and, when the rotational speed exceeds 6000 revolutions per minute, about the half of the electric power consumption of a spindle motor becomes a fluid loss. Thereby, an increase in actual electric power consumption is not increased in proportion to the square of the rotational speed of the disc, and the increase rapidly grows.

In a current DVD disc drive, the rotational speed of a disc becomes about 10000 revolutions per minute at 16-time speed DVD recording and reproduction. Furthermore, the rotational speed of the disc becomes about 12000 revolutions per minute at 20-time speed DVD recording and reproduction. When the rotational speed of a disc is increased as described above, the fluid loss is rapidly increased, and the electric power consumption of a spindle motor is increased. The power-supply voltage of the disc drive generally is 12V, though the voltages vary depending on specifications. When the electric power consumption of a spindle motor is increased, the voltage does not meet the specification of the power-supply voltage.

As described in Japanese Patent Application Laid-Open No. 2003-228971, it has been known that it is acceptable to reduce the thickness of an air layer on the surface of a disc in order to decrease a fluid loss with respect to the disc. Especially, fluid resistance is reduced by decreasing the thickness of the air layer on the upper surface of the disc.

SUMMARY OF THE INVENTION

In the example described in Japanese Patent Application Laid-Open No. 2003-228971, there is provided a ring-like protruding portion in a main frame in such a way that the portion faces a disc. Thereby, the thickness of a space on the upper surface of a disc becomes small. However, there are caused various kinds of problems when the thickness of the space on the upper surface of the disc is made small. For example, according to a general specification of a disc, a deformation amount at the periphery of a disc is ±0.5 mm. Accordingly, the warp or the deformation of the disc cannot be allowed when the ring-like protruding portion is provided in the main frame.

When rotation of a disc is started, it is required to secure a space on the upper surface of the disc, considering the form accuracy and the assembly accuracy of structural parts such as a disc loading mechanism and a unit mechanism.

The object of the present invention is to provide a disc drive by which the fluid loss of a disc can be reduced and the electric power consumption of a spindle motor can be decreased.

In a disc drive according to the present invention, there is provided a rotation load reducing member between a top cover and a disc. The rotation load member is movably supported by a clearance adjustment member. While the disc is rotating, the rotation load member moves in the direction toward the disc. The thickness of an air layer on the upper surface of the disc is decreased.

According to the disc drive of the present invention, the fluid loss of a disc can be reduced, and the electric power consumption of a spindle motor can be decreased.

DESCRIPTION OF REFERENCE NUMERALS

Figure 1:
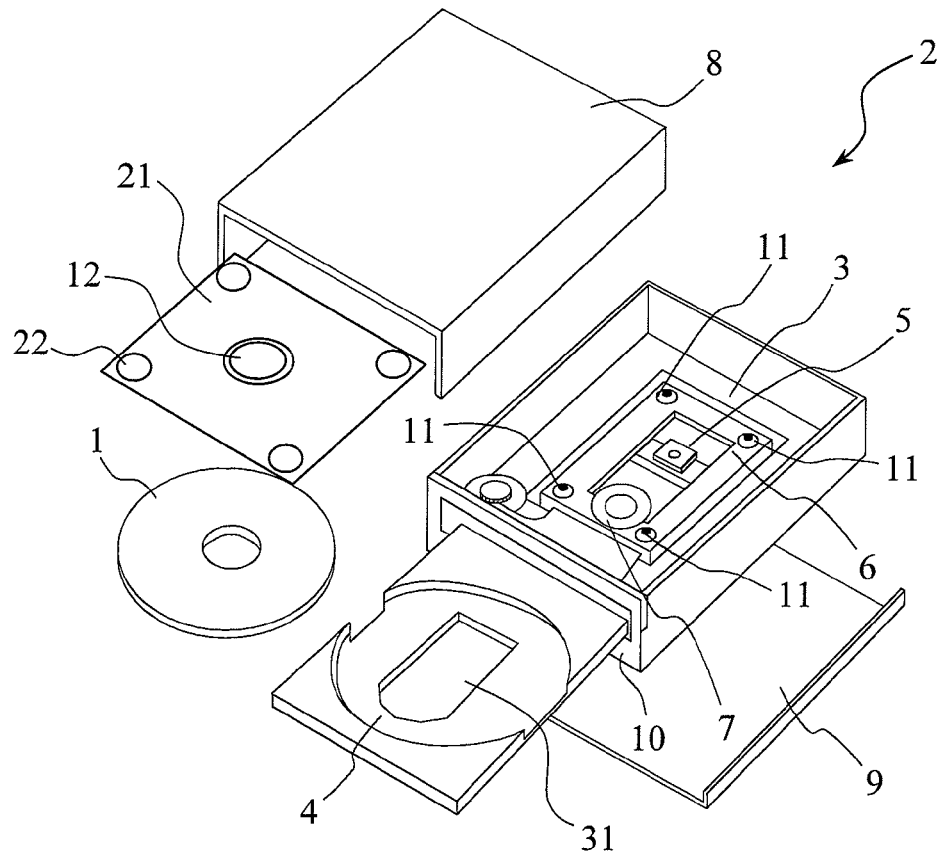
FIG. 1 is a view showing a configuration of a disc drive according to the present invention.

1: disc, 2: disc drive, 3: base, 4: disc tray, 5: optical head, 6: chassis, 7: spindle motor, 8: top cover, 9: bottom cover, 10: front panel, 11: insulator, 12: disc clamper, 21: rotation load reducing member, 22: clearance adjustment member, 23: lid, 31: opening (for optical head)

DESCRIPTION OF THE PREFERRED EMBODIMENTS

Hereinafter, embodiments for building a disc drive according to the present invention will be explained referring to attached drawings. FIGS. 1 through 8 are drawings illustrating embodiments according to the present invention, and portions denoted by the same reference numerals in the above drawings denote the same components and have similar basic configurations and operations.

A configuration of a disc drive according to one embodiment of the present invention will be explained referring to FIG. 1. FIG. 1 is an exploded perspective view for a disc drive 2 and a recording medium (hereinafter, called disc 1) in the present embodiment. A disc drive 2 is a device by which information is recorded on the recording side of the disc 1 with a diameter of 120 mm and a thickness of 1.2 mm, and is reproduced, wherein the disc 1 includes a CD, a DVD, a BD (blue ray disc), an HD-DVD, and the like, and has a shape of a box with a dimension of 150 mm in width×195 mm in depth×40 mm in thickness.

The disc drive 2 has a casing including a top cover 8 and a bottom cover 9, which are obtained by press working of a metal plate such as rolled steel. A front panel 10 is provided at the front end of the casing. A base 3 of a resin molded product is provided in the casing. The disc drive 2 has a disc tray 4 by which the disc 1 is carried in and out. A circular recess slightly larger than the outer diameter of the disc 1 is formed on the disc tray 4. An opening 31 is formed in the above circular recess. The disc tray 4 is supported in an ejectable or retractable manner by a guide mechanism provided in the base 3.

The unit mechanism is elastically supported by insulators 11 provided at four corners of the base 3. The unit mechanism has a chassis 6. An optical head 5 for recording and reproduction of information onto and from the disc 1, a unit for driving the optical head 5 along in the radial direction of the disc 1, and a spindle motor 7 for rotation of the disc 1 are installed on the chassis 6.

In the disc drive 2 according to the present example, a plate-like rotation load reducing member 21 is provided between the top cover 8 and the disc 1. The rotation load reducing member 21 has a size larger than the outer diameter of the disc 1. The rotation load reducing member 21 has a disc damper 12 in the center portion. The rotation load reducing member 21 is elastically supported on the base 3 by clearance adjustment members 22 at four corners. The clearance adjustment member 22 elastically supports the rotation load reducing member 21, and has a function by which a distance between the rotation load reducing member 21 and the disc 1 is adjusted. The clearance adjustment member 22 may be formed of a spring.

The clearance adjustment members 22 are provided at four corners in the shown example, but the adjustment members 22 may be provided at three places.

When information is recorded or is reproduced, the disc tray 4 holding the disc 1 is stored in the casing. The turntable portion of the spindle motor 7 is projected from a center hole of the disc 1 to lift the disc 1. The turntable portion of the spindle motor 7 is attracted to the disc damper 12 by magnetic attraction force. Thus, the disc 1 is fixed to the turntable portion of the spindle motor 7 in a state in which the disc 1 is floated up from the disc tray 4. The spindle motor 7 rotates the disc 1 at a predetermined rotational speed for recording and reproduction through the optical head 5.

Generally, a fluid loss is generated on the disc 1 when the disc 1 is rotated at high speed. The generation mechanism of the fluid loss will be explained referring to FIG. 2. According to the present example, the rotation load reducing member 21 is moved so as to approach the disc 1, when the rotational speed of the disc 1 is increased. Accordingly, there is caused smaller distance between the rotation load reducing member 21 and the disc 1. Thereby, the fluid loss on the disc 1 can be reduced, and the fluid load of the spindle motor 7 can be reduced.

The generation mechanism of a fluid loss sustained on the disc 1 will be explained referring to FIG. 2. When the disc 1 is rotated, the disc 1 receives viscous resistance force from air. The above viscous resistance force generates fluid load, that is, a fluid loss. The viscous resistance force depends on the rotation speed of the disc 1. That is, the viscous resistance force is increased when the rotation speed of the disc 1 is increased. On the other hand, air in contact with the upper surface and the lower surface of the disc 1 receives, from the disc 1, force caused by viscous force. By the above force, centrifugal force and rotational force are given to air in contact with the upper surface and lower surface of the disc 1. Thereby, the air is spirally moved. Accordingly, an air flow is generated radially outwardly along the upper surface and the lower surface of the disc 1 as shown by arrows in the cross-sectional view of the disc drive. In the vicinity of each of the upper surface and the lower surface of the disc 1, a lower pressure is generated along the radially inner area on the disc 1, and a higher pressure is generated along the radially outer area on the disc 1. An air circulation flow is caused by the above pressure difference as will be explained in the following.

A space above the upper surface of the disc 1 will be referred to as an "upper space". The upper space is formed by a clearance between the upper surface of the disc 1 and the top cover 8, and in the case of a general disc drive, its thickness Xt is from 6 mm to 7 mm. The upper space is enclosed by the top cover 8, and air does not flow thereinto from the outside. Accordingly, when the pressure of the center portion of the upper space becomes low, air flows thereinto along the top cover 8. Thus, an air flow moving radially outwardly along the upper surface of the disc 1 is generated in the upper space, and, oppositely, an air flow moving radially inwardly along the top cover 8 is generated in the upper space. That is, an air circulating flow is generated.

The direction of the air flow in the center portion of the upper space is reversed. Accordingly, a turbulent flow is generated. When the turbulent flow is generated, the viscous resistance to the disc 1, that is, a fluid loss is increased to grow the fluid load of the spindle motor 7.

A space below the lower surface of the disc 1 will be referred to as a "lower space". The lower space is formed by a clearance between the lower surface of the disc 1 and the tray 4, and its thickness is from 2 mm to 3 mm in the case of a general disc drive. The lower space is communicated with a space at the lower portion of the casing through the opening 31 in the tray 4. When the pressure of the center portion of the lower space becomes low, air flows thereinto through the opening 31 in the tray 4. When the pressure of the outer portion of the lower space becomes high, air flows from the periphery of the tray 4 into the space under the tray 4. Thus, an air circulating flow is generated in the lower space.

In the center portion of the lower space, air flows thereinto through the opening 31 of the tray 4, but the flow direction of the air is not reversed. Thereby, a turbulent flow is not caused.

Accordingly, in order to reduce the air viscous resistance applied onto the disc 1, a turbulent flow is required to be prevented from being generated in the center portion in the upper space. As explanation will be made hereinafter using FIGS. 3A and 3B, the viscous resistance of air is reduced when the thickness of the upper space is reduced to prevent a turbulent flow from being generated. That is, the fluid resistance is reduced, and the electric power consumption of the spindle motor 7 is reduced.

Figure 3A:
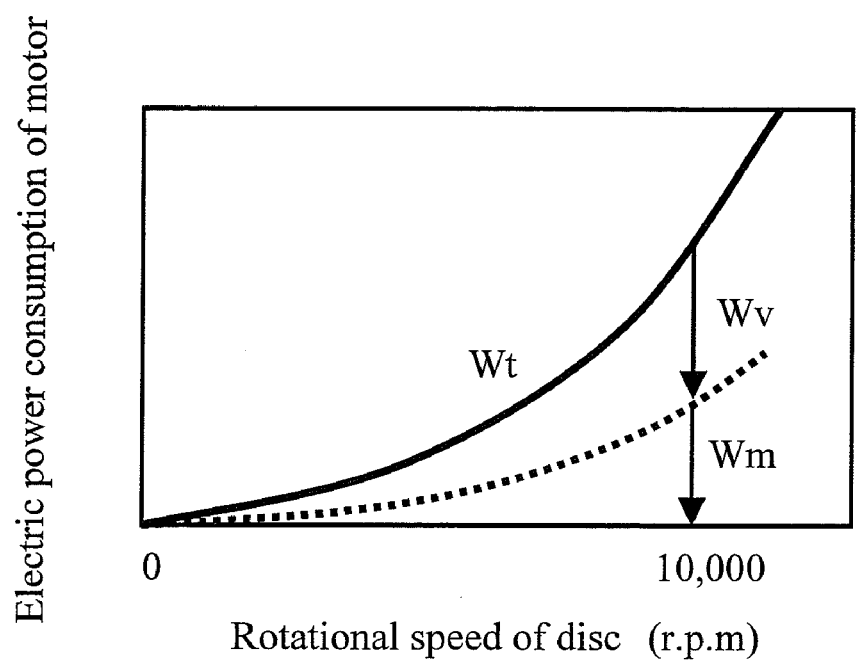
FIG. 3A is a view showing a relation between rotation of a disc and the electric power consumption of a motor.

Referring to FIG. 3A, there will be explained a relation between the rotational speed of the disc in the disc drive and the electric power consumption of the spindle motor 7. A solid curve shown in FIG. 3A shows a relation between the rotational speed of the disc and the electric power consumption of the spindle motor 7. The vertical axis represents the electric power consumption of the spindle motor 7, and the horizontal axis represents the rotational speed of the disc. As shown in the drawing, the electric power consumption of the spindle motor 7 is increased approximately according to the square of the rotational speed of the disc. The electric power consumption Wt of the spindle motor 7 depends on a mechanical loss Wm of the motor, and the fluid loss Wv of the disc. The mechanical loss Wm of the motor includes a copper loss, an iron loss, a bearing loss, and a circuit loss. The fluid loss Wv of the disc is caused by the air viscous resistance applied to the disc. As shown in the drawing, the fluid loss Wv is equal to about half the electric power consumption of the spindle motor 7. When the rotational speed of the disc is, for example, 10000 revolutions per minute, (corresponding to 16-time speed DVD recording and reproduction), about 50% or more of the electric power consumption of the spindle motor 7 becomes a fluid loss.

Figure 3B:
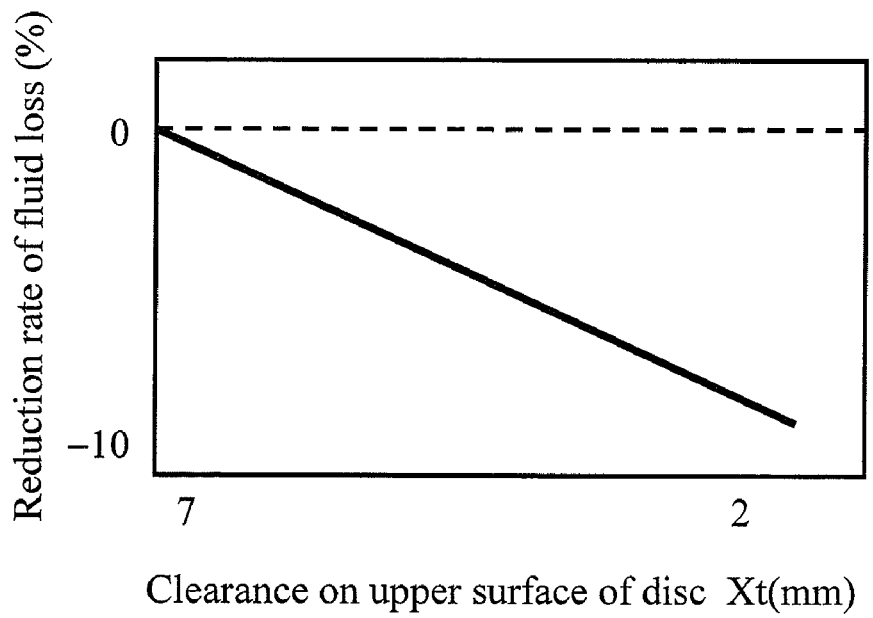
FIG. 3B is a view showing a relation between a clearance on the upper surface of the disc and a reduction rate of a fluid loss.

Referring to FIG. 3B, a relation between the thickness Xt of the upper space of the disc and a reduction rate of the fluid loss Wv will be explained. The vertical axis of FIG. 3B represents a reduction rate of the fluid loss Wv, and the horizontal axis represents a thickness Xt of the upper space of a disc. As shown in the drawing, the reduction rate of the fluid loss Wv is increased when the thickness Xt of the upper space is reduced. Accordingly, the thickness Xt of the upper space of the disc may be reduced in order to reduce the fluid loss Wv. In the case of a general disc drive, the upper space Xt is corresponding to a clearance between the upper surface of the disc 1 and the top cover 8, and is equal to about 7 mm. Accordingly, the reduction rate of the fluid loss Wv becomes about 10% when the thickness Xt of the upper space is, for example, about 2 mm. That is, the fluid loss Wv can be reduced by about 10%.

Figure 4A:
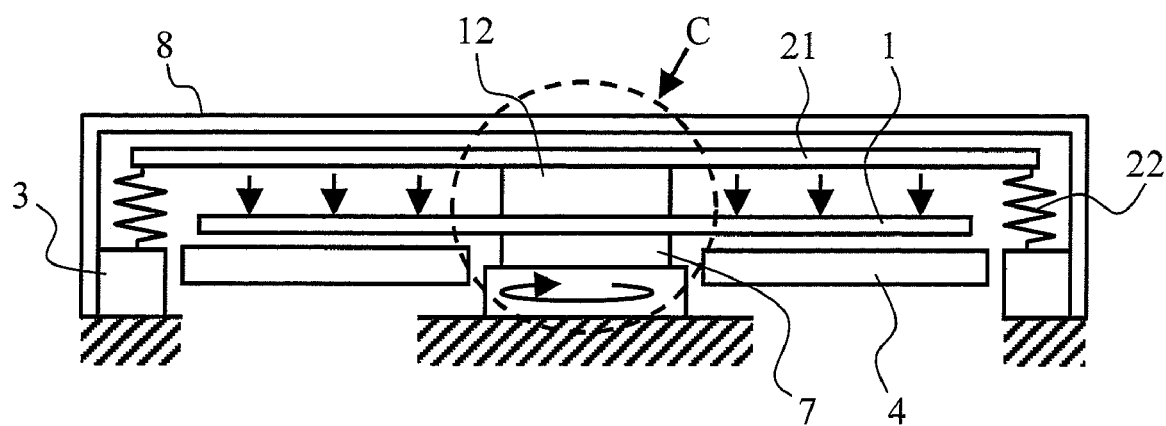
FIGS. 4A and 4B are a view showing a structure of a rotation load reducing member in a disc drive according to the present invention.
Figure 4B:
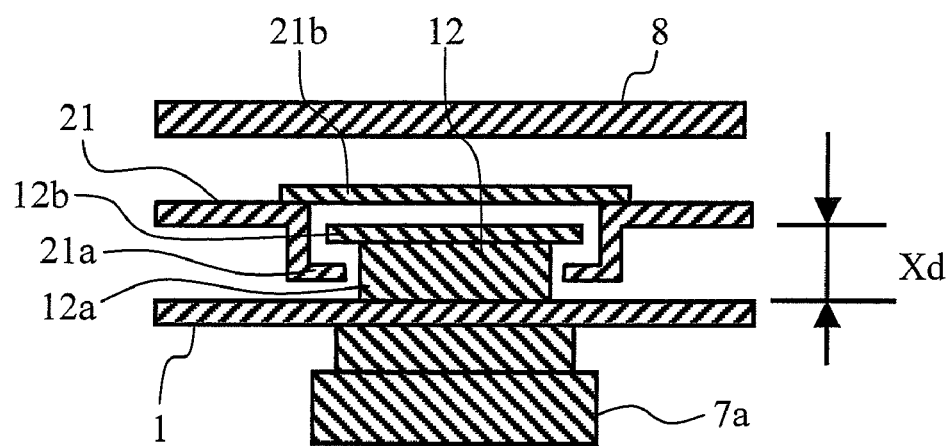

Referring to FIGS. 4A and 4B, there will be explained a structural example of the clearance adjustment member 22 in the rotation load reducing member 21 of the disc drive of the present invention. According to the present example, the rotation load reducing member 21 is provided between the top cover 8 and the disc 1, as shown in FIG. 4A. The end portion of the rotation load reducing member 21 is held on the base 3 by at least two clearance adjustment members 22. The clearance adjustment member 22 may have a function, by which the size of a clearance between the rotation load reducing member 21 and the disc 1 is changed, and is composed of an elastic member such as a spring. The rotation load reducing member 21 is formed in substantially a flat-plate-like shape, and has a rectangular, or circular shape having an outer diameter larger than that of the disc 1. The rotation load reducing member 21 keeps the distance between the rotation load reducing member 21 and the disc 1 substantially constant by covering the whole of the upper surface of the disc. Thereby, a turbulent flow is prevented from being generated on the upper surface of the disc. Moreover, a uniform flow is generated on the upper surface of the disc to prevent pressure turbulence. According to the present example, the disc 1 is rotated to move the rotation load reducing member 21. Thereby, the clearance on the upper surface of the disc becomes small to reduce the fluid loss.

FIG. 4B shows a detailed structure of the disc damper 12 shown in the C portion of FIG. 4A. In the present example, the disc damper 12 is provided on the rotation load reducing member 21. Usually, the disc damper 12 is provided in the top cover 8. However, the disc damper 12 is provided on the rotation load reducing member 21 because the rotation load reducing member 21 is provided between the top cover 8 and the disc 1 in the present example. The disc damper 12 has a pillar portion 12a and a flange portion 12b. On the other hand, the rotation load reducing member 21 has a circumferential projecting portion 21a and a lid portion 21b. The inner diameter of the circumferential projecting portion 21a is larger than the outer diameter of the pillar portion 12a and smaller than the outer diameter of the flange portion 12b. Accordingly, when the disc 1 is not loaded, the disc damper 12 is held by the rotation load reducing member 21 in a state in which the flange portion 12b is engaged with the projecting portion 21a. As shown in FIG. 4B, when the disc 1 is loaded, the turntable portion 7a of the spindle motor 7 is joined with the pillar portion 12a of the disc damper 12 by magnetic force. At this time, the disc 1 is held by the turntable portion 7a of the spindle motor 7 and the pillar portion 12a of the disc damper 12. In the present example, air is prevented from flowing from the one side to the other side of the rotation load reducing member 21 through the clearance between the disc damper 12 and the circumferential projecting portion 21a of the rotation load reducing member 21, because the rotation load reducing member 21 has the lid portion 21b.

Accordingly, negative pressure is maintained when the pressure of the space between the disc 1 and the rotation load reducing member 21 becomes negative.

Referring to FIG. 4A again, a basic operation of load reduction by a high-speed rotation of the disc 1 in the present invention will be explained. When rotation of the disc is stopped, the rotation load reducing member 21 is arranged at an initial position. At the initial position, a clearance Xd0 between the disc 1 and the rotation load reducing member 21 is a sum of a deformation amount dl of the disc 1, a distance d2 of a space, which is required for prevention of contact between the disc 1 and other components, and a distance d3 of a space, which is required for movement of the mechanism at disc loading operation.

The deformation amount dl of the disc 1 is ±0.5 mm which is a maximum surface wobbling amount of the disc 1, wherein the maximum value is determined by a standard. The distances d2 and d3 are determined by the processing accuracy and the assembly accuracy of each component. Considering the above conditions, the clearance Xd0 on the upper surface of the disc 1 becomes several millimeters.

When the disc is rotated, the rotation load reducing member 21 is arranged at an operation position. At the operation position, a clearance Xd1 between the disc 1 and the rotation load reducing member 21 is decided by a deformation amount of the clearance adjustment member 22. Force moving the rotation load reducing member 21 along the axis line direction of the disc 1 is generated by a difference between the pressures acting on the upper and lower surfaces of the disc 1.

Figure 2:
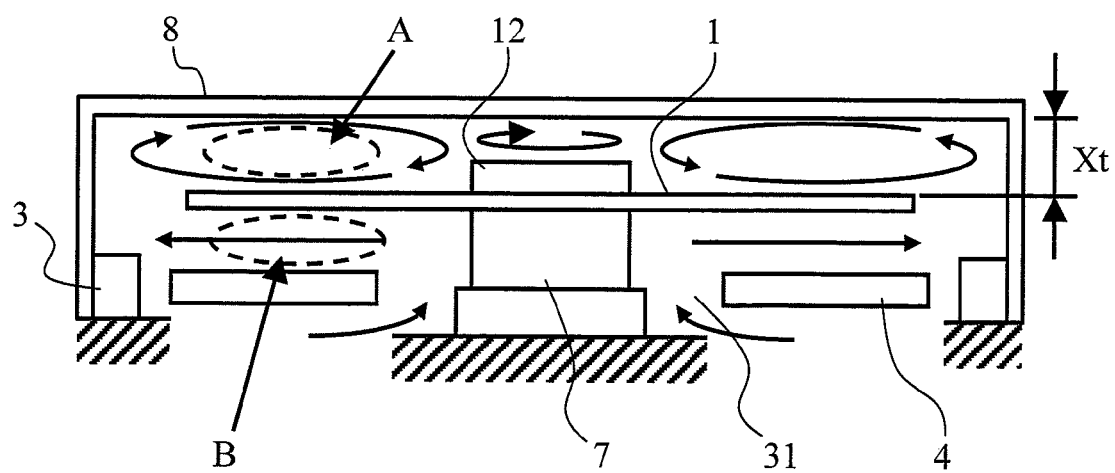
FIG. 2 is a view explaining a flow of air in the disc drive.

The pressure-difference generation mechanism has been already explained referring to FIG. 2. Simply repeating here, air flows along the upper surface of the disc 1 radially outwardly in the upper space ("A" portion in the drawing) of the disc 1 as shown in FIG. 2. Thereby, the pressure is reduced in the vicinity of the upper surface of the disc 1. On the other hand, air flows radially inwardly in the vicinity of the ceiling of the top cover 8. Thereby, a circulating flow is generated in the upper space of the disc 1. However, the pressure is reduced in the vicinity of the upper surface of the disc 1 even if such a circulating flow is generated. The smaller the clearance Xd1 between the disc 1 and the rotation load reducing member 21 becomes, the larger the pressure drop on the upper surface of the disc 1 becomes.

On the other hand, air flows through the opening 31 in the tray 4 in the lower space ("B" portion in the drawing) of the disc 1. Thereby, the pressure is not reduced in the lower space of the disc 1. Thus, there is caused a difference between the pressures acting on the upper surface and lower surface of the disc 1.

A smaller clearance Xd1 between the disc 1 and the rotation load reducing member 21 causes the pressure difference between a pressure acting on the upper surface and that on the lower surface of the disc 1 to become larger.

When an attraction force caused by a difference between pressures on the upper surface and the lower surface of the disc 1 is balanced with a repulsion force caused by the deformation of the clearance adjustment member 22, the rotation load reducing member 21 rests. When the clearance adjustment member 22 includes a spring, the rotation load reducing member 21 can be held at a desired position by adjusting a spring rigidity, or a spring constant.

According to the present invention, an air flow in the upper space of the disc 1 is made a laminar flow because the thickness of the upper space of the disc 1 becomes small by providing the rotation load reducing member 21. Thereby, a fluid sound caused by rotation of the disc 1 is reduced. Thus, temperature in the disc drive 2 can be reduced because the electric power consumption of the spindle motor 7 can be decreased to control heat generation.

Figure 5A:
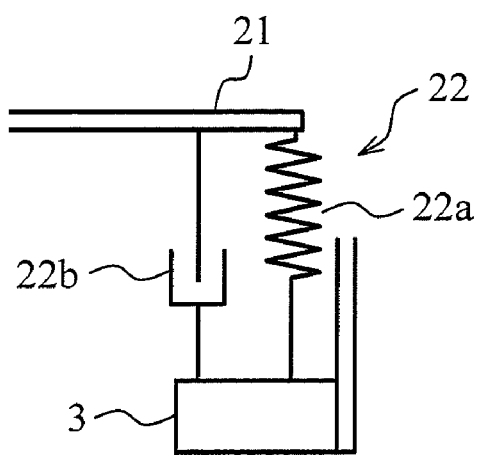
FIGS. 5A and 5B are a view showing an example for a structure of a clearance adjustment member in the disc drive according to the present invention.
Figure 5B:
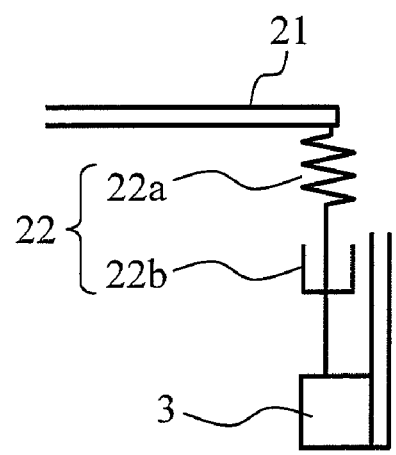

FIG. 5A and FIG. 5B show a structural example of the clearance adjustment member 22. The clearance adjustment member 22 according to the present example has a spring 22a and a dash pot 22b. In the example shown in FIG. 5A, the spring 22a and the dash pot 22b are arranged in parallel with each other. The spring 22a and the dash pot 22b are arranged in series in the example shown in FIG. 5B. The dash pot 22b provides viscous resistance to a rapid movement or an impact of the rotation load reducing member 21. Though the dash pot 22b has a function as a stopper, another stopper may be provided.

Figure 6A:
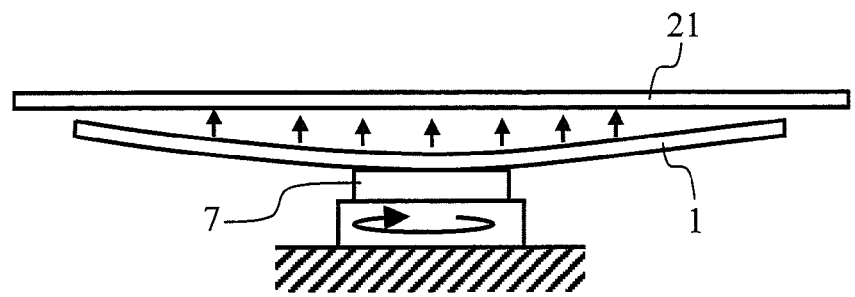
FIGS. 6A through 6C are a view showing an example of the shape of a rotation load reducing member in the disc drive according the present invention.

An example of the rotation load reducing member 21 will be explained referring to FIGS. 6A through 6C. In the example shown in FIG. 6A, the lower surface of the rotation load reducing member 21 is a plane. As described above, the pressure of the upper space of the disc becomes negative, when the disc 1 is rotated at high speed. Thereby, the disc 1 is attracted in the direction toward the rotation load reducing member 21. However, the center of the disc is held by the disc damper 12 and the turntable of the spindle motor 7. Accordingly, the outer peripheral portion of the disc 1 is warped upward, and the disc 1 has a curved shape. When the disc 1 is deformed as described above, the recording and reproduction performance is deteriorated.

Figure 6B:
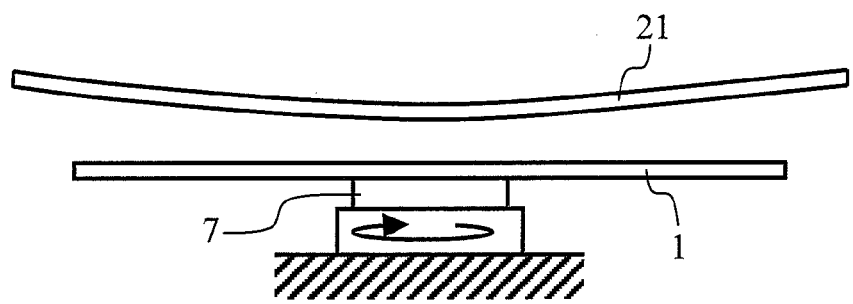

In an example shown in FIG. 6B, the rotation load reducing member 21 is curved. That is, the rotation load reducing member 21 in the present example is curved, corresponding to the curving of the disc 1 in the example shown in FIG. 6A. Accordingly, the clearance between the rotation load reducing member 21 and the disc 1 becomes larger outward in the radial direction from the center. The intensity of the negative pressure in the upper space on the disc is determined by the clearance between the rotation load reducing member 21 and the disc 1. That is, the smaller clearance between the rotation load reducing member 21 and the disc 1 causes the intensity of the negative pressure in the upper space of the disc to become larger, and the larger clearance between the rotation load reducing member 21 and the disc 1 causes the intensity of the negative pressure to become smaller. Accordingly, in the present example, the intensity of the negative pressure becomes smaller and the amount of deformation becomes smaller in the radially outer portion of the disc. Thereby, the negative pressure on the outer peripheral portion of the disc is reduced to prevent the warp of the disc 1.

Figure 6C:
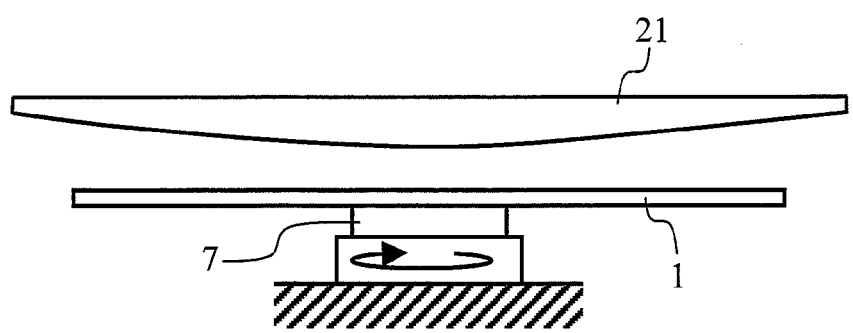

In an example shown in FIG. 6C, the lower surface of the rotation load reducing member 21 is curved, but the upper surface thereof is a plane. That is, the thickness of the rotation load reducing member 21 is larger above the center of the disc, and smaller above the periphery of the disc. Accordingly, the clearance between the rotation load reducing member 21 and the disc 1 becomes larger radially outwardly in the same manner as that of the example shown in FIG. 6B. Thus, even in the present example, the negative pressure on the radially outer area on the disc is reduced to prevent the warp of the disc 1.

Figure 7A:
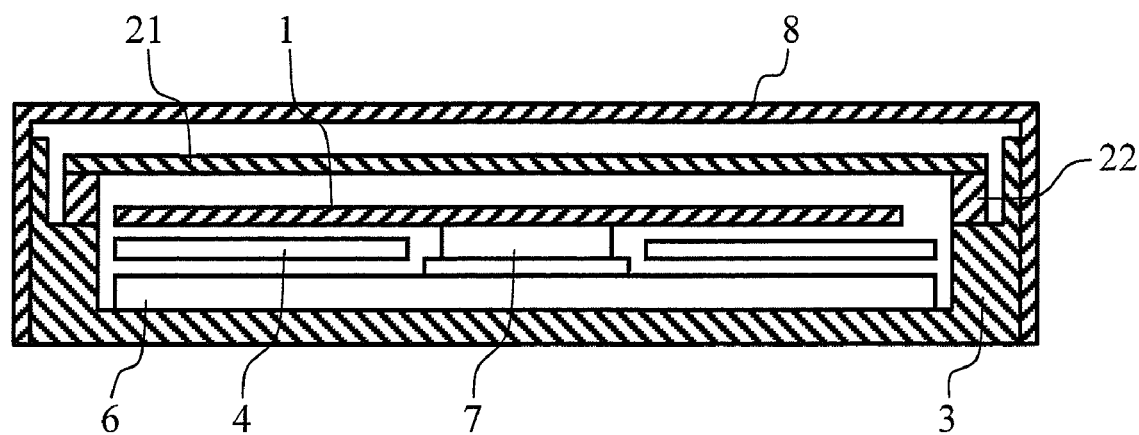
FIGS. 7A and 7B are a view showing a structural example of the clearance adjustment member in the disc drive according to the present invention.

An example of the clearance adjustment member 22 will be explained referring to FIGS. 7A and 7B. The clearance adjustment member 22 includes an elastic member such as a metal spring and rubber. In the example shown in FIG. 7A, the clearance adjustment member 22 is attached to the base 3. When clearance adjustment member 22 has the spring, the spring of the clearance adjustment member 22 receives compression force in the present example.

Figure 7B:
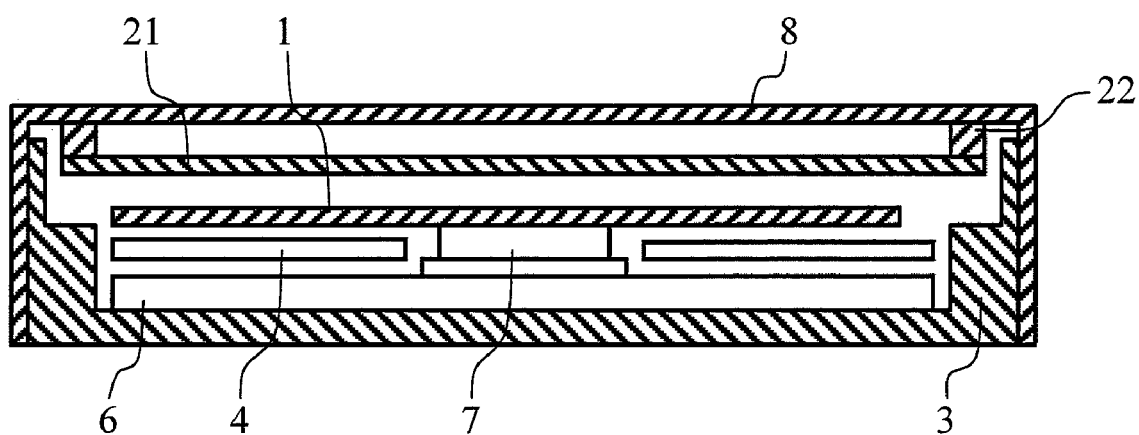

In the example shown in FIG. 7B, the clearance adjustment member 22 is attached to the top cover 8. When the clearance adjustment member 22 has a spring, a spring of the clearance adjustment member 22 receives tensile force in the present example. Here, there has been explained a case in which the clearance adjustment member 22 absorbs force in the vertical direction. However, the rigidity of the clearance adjustment member 22 in the horizontal direction may be increased in order to prevent unnecessary vibration of the rotation load reducing member 21 in the horizontal direction.

Figure 8:
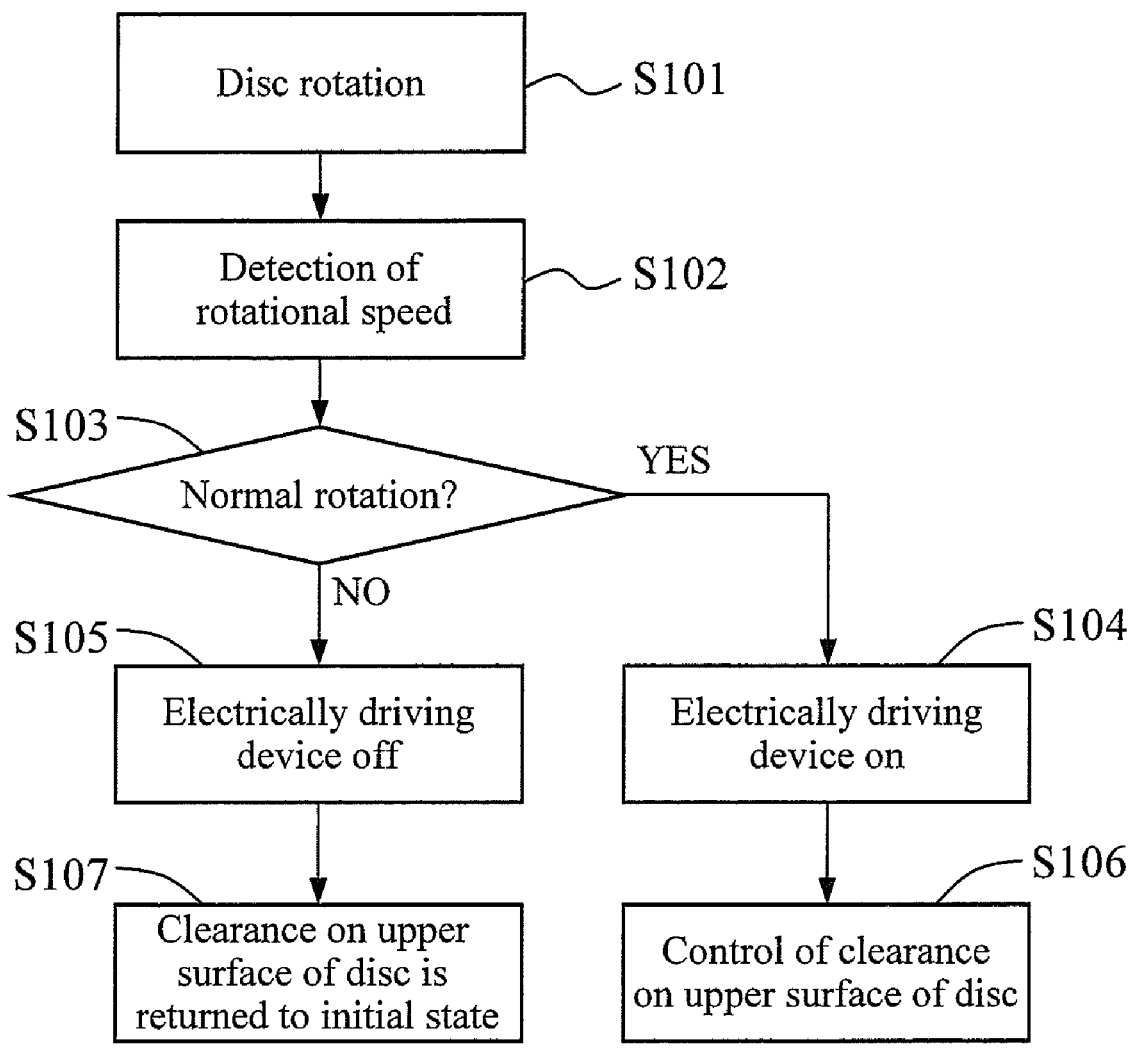
FIG. 8 is a view showing an example of a method for controlling the clearance adjustment member in a disc drive according to the present invention.

An example of a method for controlling the rotation load reducing member 21 and the clearance adjustment member 22 will be explained referring to FIG. 8. In the present example, the clearance adjustment member 22 is driven by an electrically driving device. The electrically driving device may be an electromagnetic solenoid, an electromagnetic actuator, a fluid actuator, or the like. First, the disc is rotated at step S101. At step S102, the rotational speed of the disc is detected. At step S103, it is judged whether the disc is normally rotated. There may be an acceptable, for example, judgement in which, when the rotational speed of the disc exceeds a predetermined one, the state is normal, and, when the rotational speed does not exceed the predetermined one, the state is not normal. When the rotation is normal, the processing proceeds to step S104, and, when the rotation is not normal, the processing proceeds to step S105. At step S104, the power supply of the electrically driving device is turned on. The clearance adjustment member 22 is operated at step S106, and the rotation load reducing member 21 is moved to an operation position. The clearance between the rotation load reducing member 21 and the disc is kept at a predetermined value Xd1. At step S105, the power supply of the electrically driving device is turned off. At step S107, the operation of the clearance adjustment member 22 is stopped, and the rotation load reducing member 21 returns to the former initial position. The clearance between the rotation load reducing member 21 and the disc is kept at a predetermined initial value Xd0.

Thus, the clearance adjustment member 22 is controlled using the electrically driving device, according to the present example. Accordingly, when the disc drive 2 is abnormally operated like in a case in which the disc is improperly loaded, there is a possibility that the rotation load reducing member 21 is moved downward, and the disc 1 is damaged. Then, according to the present example, such damage of the disc 1 can be prevented by judgement whether rotation of the disc 1 is normal.

There may be provided another example of the operation method of the rotation load reducing member 21 according to the present invention. In the example, the rotational speed of the discs 1 is directly detected, and the position of the rotation load reducing member 21 is controlled according to the rotational speed. The position of the rotation load reducing member 21 may be continuously, or incrementally changed. For example, an electrically driving means using a piezoelectric element and the like are listed as a means by which the position of the rotation load reducing member 21 is controlled in an analog manner according to the rotational speed.

Though the examples of the present invention have been explained above, it will be appreciated by persons skilled in the art that the present invention is not limited to the above-described examples, and various modifications may be made within the scope of the invention as defined by the appended claims.

The present invention can be used for an optical disc drive.

What is claimed is:

1. A disc drive having a casing including a top cover and a bottom cover, a base arranged in said casing, a unit mechanism installed on said base, a chassis installed in said unit mechanism, an optical head and a spindle motor installed in said chassis, and a disc tray on which a disc is carried into and out from said disc drive, comprising:
    a rotation load reducing member including a plate-like member arranged between said top cover and said disc on said disc tray;
    a clearance adjustment member which movably supports said rotation load reducing member; and
    an actuator device for driving said clearance adjustment member;
    wherein said actuator device drives said clearance adjustment member in such a way that, at the time of disc rotation, a clearance between said rotation load reducing member and said disc on said disc tray becomes a predetermined value; and
    wherein said actuator device drives said clearance adjustment member based on the rotational speed of said disc.

2. The disc drive according to claim 1, wherein said clearance adjustment member has a spring.

3. The disc drive according to claim 1, wherein said clearance adjustment member has a dash pot.

4. A disc drive having a casing including a top cover and a bottom cover, a base arranged in said casing, a unit mechanism installed on said base, a chassis installed in said unit mechanism, an optical head and a spindle motor installed in said chassis, and a disc tray on which a disc is carried into and out from said disc drive, comprising:
    a rotation load reducing member including a plate-like member arranged between said top cover and said disc on said disc tray;
    a clearance adjustment member which movably supports said rotation load reducing member; and
    an actuator device for driving said clearance adjustment member;
    wherein said actuator device drives said clearance adjustment member in such a way that, at the time of disc rotation, a clearance between said rotation load reducing member and said disc on said disc tray becomes a predetermined value; and
    wherein said actuator device drives said clearance adjustment member in such a way that said rotation load reducing member is incrementally moved based on the rotational speed of a disc.

5. A disc drive having a casing including a top cover and a bottom cover, a base arranged in said casing, a unit mechanism installed on said base, a chassis installed in said unit mechanism, an optical head and a spindle motor installed in said chassis, and a disc tray on which a disc is carried into and out from said disc drive, comprising:
    a rotation load reducing member including a plate-like member arranged between said top cover and said disc on said disc tray;
    a clearance adjustment member which movably supports said rotation load reducing member; and
    an actuator device for driving said clearance adjustment member;
    wherein said actuator device drives said clearance adjustment member in such a way that, at the time of disc rotation, a clearance between said rotation load reducing member and said disc on said disc tray becomes a predetermined value; and
    wherein said actuator device stops driving of said clearance adjustment member when the rotational speed of said disc is equal to, or smaller than a predetermined value.

6. A disc drive having a casing including a top cover and a bottom cover, a base arranged in said casing, a unit mechanism installed on said base, a chassis installed in said unit mechanism, an optical head and a spindle motor installed in said chassis, and a disc tray on which a disc is carried into and out from said disc drive, comprising:
    a rotation load reducing member including a plate-like member arranged between said top cover and said disc on said disc tray;
    a clearance adjustment member which movably supports said rotation load reducing member; and
    an actuator device for driving said clearance adjustment member;
    wherein said actuator device drives said clearance adjustment member in such a way that, at the time of disc rotation, a clearance between said rotation load reducing member and said disc on said disc tray becomes a predetermined value; and
    wherein said actuator device drives said clearance adjustment member when the rotational speed of said disc is larger than a predetermined value.

* * * * *